(12) United States Patent
Sinsabaugh

(10) Patent No.: US 7,973,236 B2
(45) Date of Patent: Jul. 5, 2011

(54) OPTICAL SHUTTER FOR IMPROVED PHOTOVOLTAIC ARRAY THERMAL PERFORMANCE

(75) Inventor: Steven L. Sinsabaugh, Uniontown, OH (US)

(73) Assignee: Lockheed Martin Corporation, Bethesda, MD (US)

(*) Notice: Subject to any disclaimer, the term of this patent is extended or adjusted under 35 U.S.C. 154(b) by 347 days.

(21) Appl. No.: 12/157,035

(22) Filed: Jun. 6, 2008

(65) Prior Publication Data

US 2009/0301546 A1 Dec. 10, 2009

(51) Int. Cl.
*H02N 6/00* (2006.01)
*H01L 31/042* (2006.01)
*H02J 7/00* (2006.01)
*H01M 10/46* (2006.01)

(52) U.S. Cl. .............. 136/246; 136/245; 320/101
(58) Field of Classification Search ............. 136/246, 136/245; 320/101
See application file for complete search history.

(56) References Cited

U.S. PATENT DOCUMENTS

| | | | | |
|---|---|---|---|---|
| 3,247,392 A | * | 4/1966 | Thelen | 250/226 |
| 4,240,021 A | * | 12/1980 | Kashima et al. | 320/101 |
| 5,289,998 A | * | 3/1994 | Bingley et al. | 244/172.7 |
| 5,467,204 A | * | 11/1995 | Hatano et al. | 358/482 |
| 5,501,080 A | * | 3/1996 | McManus et al. | 62/55.5 |
| 6,055,089 A | * | 4/2000 | Schulz et al. | 359/270 |
| 6,224,016 B1 | * | 5/2001 | Lee et al. | 244/30 |
| 6,319,596 B1 | | 11/2001 | Kernander et al. | 428/215 |
| 2003/0231398 A1 | * | 12/2003 | Cutaia | 359/608 |

* cited by examiner

*Primary Examiner* — Basia Ridley
*Assistant Examiner* — Allison Bourke
(74) *Attorney, Agent, or Firm* — Renner Kenner Greive Bobak Taylor & Weber

(57) ABSTRACT

A photovoltaic array with improved thermal performance includes a photovoltaic array, an electro-optic shutter disposed on the photovoltaic array, and a control system connected to at least the electro-optic shutter. The control system, based upon input from a sensor, switches the electro-optic shutter between transmissive and reflective conditions so as to control exposure of light to the photovoltaic array.

4 Claims, 3 Drawing Sheets

OPTICAL SHUTTER FOR IMPROVED PHOTOVOLTAIC ARRAY THERMAL PERFORMANCE

TECHNICAL FIELD

The present invention is related to airships or any other surfaces which might support a photovoltaic array. More specifically, the present invention is related to an electro-optic shutter which is associated with the photovoltaic array so as to regulate the temperature of the array and any supporting structure.

BACKGROUND

Generally, lighter-than-air vehicles, hereinafter airships, utilize photovoltaic arrays, also referred to as solar arrays, for the generation of power. This power is utilized to control operation of propulsion systems, communications equipment, and also surveillance instruments that may be carried by the airship.

Photovoltaic, or solar, arrays comprise a plurality of cells that are fundamentally designed to have high absorptivity in the solar visible and near visible infrared light spectrums. A fraction of this absorbed spectral energy is converted to electromotive power, also referred to as electrical energy, which is the inherent function of a solar or photovoltaic cell. Much of the remainder of the absorbed solar spectrum is converted to heat, thereby increasing the temperature of the cell and, via conduction, any underlying structures. Skilled artisans will appreciate that this extra heat can have detrimental effects on the underlying structures.

In certain applications of the photovoltaic array, such as in space and near-space regenerative power systems and for building roof or curtain-wall solar arrays, there may be times of the day or year when the benefits of photovoltaic electric generation are out weighed by the deleterious effects of substructural heating. For example, in a high-altitude airship, when the solar arrays are adequately powered and all energy storage capacity is utilized, absorption of extra heat in the airship may cause the supporting structure to over-heat and adversely effect the control and positioning of the airship. It is also conceivable that the extra absorbed heat could adversely effect any communications or optical equipment carried by the airship. Therefore, there is a need in the art to provide a way to reduce the impact of the excessive heat by controlling the amount of solar radiation that is exposed through the photovoltaic array when part or all of the solar array are not needed for electrical energy generation.

SUMMARY OF THE INVENTION

In light of the foregoing, it is a first aspect of the present invention to provide an optical shutter for improved photovoltaic array thermal performance.

It is another aspect of the present invention to provide an improved photovoltaic array comprising a photovoltaic array, an electro-optic shutter disposed on the photovoltaic array and a control system connected to the electro-optic shutter, the control system switching the electro-optic shutter between transmissive and reflective conditions so as to control exposure of light to the photovoltaic array.

BRIEF DESCRIPTION OF THE DRAWINGS

This and other features and advantages of the present invention will become better understood with regard to the following description, appended claims, and accompanying drawings wherein:

DETAILED DESCRIPTION OF THE INVENTION

Figure 1:
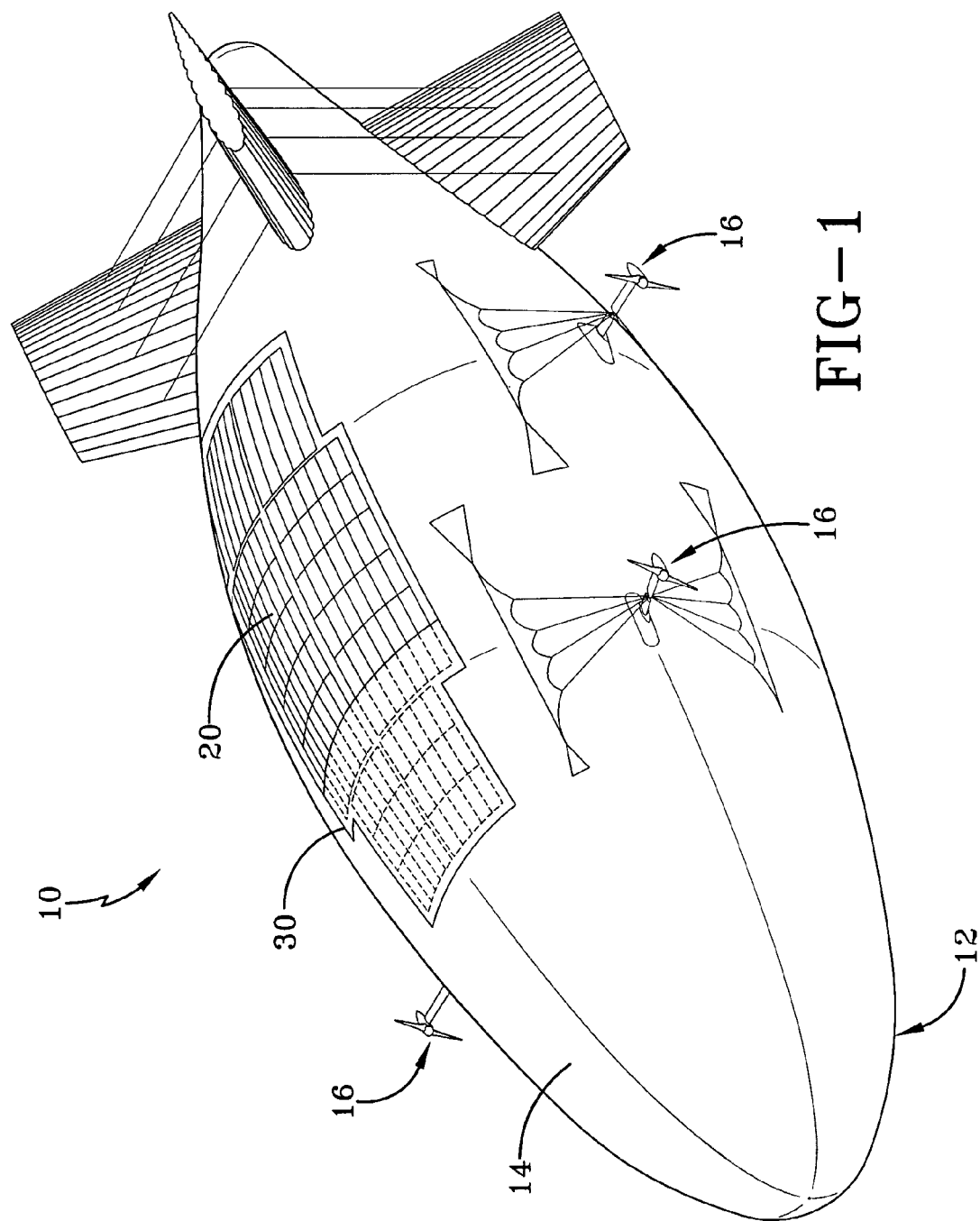
FIG. 1 is an elevated perspective view of an airship employing an optical shutter for improved photovoltaic thermal performance according to the present invention.

Referring now to the drawings and in particular to FIG. 1, it can be seen that an airship according to the present invention is designated generally by the numeral 10. The airship 10 may be employed to carry surveillance equipment, communications equipment or other payloads or cargo. In a specific embodiment, the airship may be used in high altitude configurations so that the airship may attain altitudes in excess of 60,000 feet. The airship includes a hull and one or a plurality of stabilizing fins, wherein the hull is generally identified as an envelope 12 which contains pressurized air and pressurized lighter-than-air gas for the purpose of moving the airship to a desired altitude. The airship could also be non-pressurized or rigid.

The envelope 12 includes a laminate material 14 which has attributes that are ideally suited for high-altitude flight. As such, the laminate material 14 may be a multi-layered construction which is strong, light weight, resistant to ultra-violet light and is able to withstand the rigors of extended deployment. Exemplary laminate materials are disclosed in U.S. Pat. Nos. 6,979,479 and 7,354,636; and U.S. patent application Ser. Nos. 11/443,327 filed May 30, 2006; 11/991,499 filed Mar. 4, 2008; and 12/011,509 filed Jan. 28, 2008, all of which are incorporated herein by reference.

Directional and altitude control of the airship may be provided by a plurality of propulsion systems 16 which are carried and otherwise secured to the airship envelope 12. Skilled artisans will also appreciate that other devices, such as blowers, may be associated with the airship so as to control the amount of air retained within the airship for the purpose of adjusting the altitude thereof as needed.

A photovoltaic array, designated generally by the numeral 20, which may also be referred to as a solar array, is disposed on the laminate material 14. The photovoltaic array 20 is utilized to generate electrical power which is used by the propellers, blowers and surveillance and electronic communications equipment in a well known manner. The solar array may also be used to charge rechargeable batteries if carried by the airship. The array 20 is configured to include a large number of individual cells, all of which are designed so as to absorb as much solar radiation for the purpose of generating electrical power. That solar radiation which is not absorbed for the generation of electrical power also generates significant amounts of heat which is dissipated into the atmosphere surrounding the airship, absorbed by the supporting structures such as the laminate material and potentially absorbed by the communications equipment and other cargo carried by the airship. If needed, there may be additional layers between the laminate 14 and array 20. These layers may include, but are not limited to, adhesive and insulator layers.

An electro-optic shutter, which is designated generally by the numeral 30, is disposed selectively over the solar array 20 and may also extend over portions of the envelope which do not carry the array 20. The electro-optic shutter 30 is configured to be switchable between reflective and transmissive modes. It will further be appreciated that in certain embodiments the electro-optic shutter may be controlled in sections so that certain array cells or panels may be exposed to solar radiation while others are not.

Figure 2A:
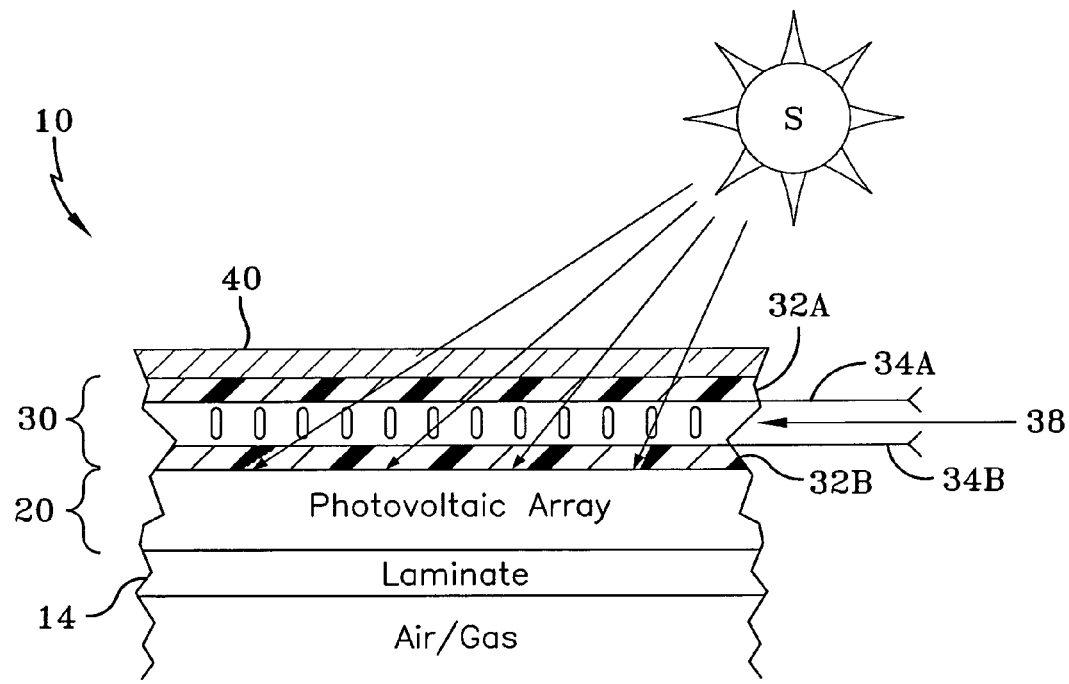
FIG. 2A is a schematic cross-sectional view of a supporting structure which carries a photovoltaic array and electro-optic shutter according to the present invention, wherein the shutter is in a transmissive mode.
Figure 2B:
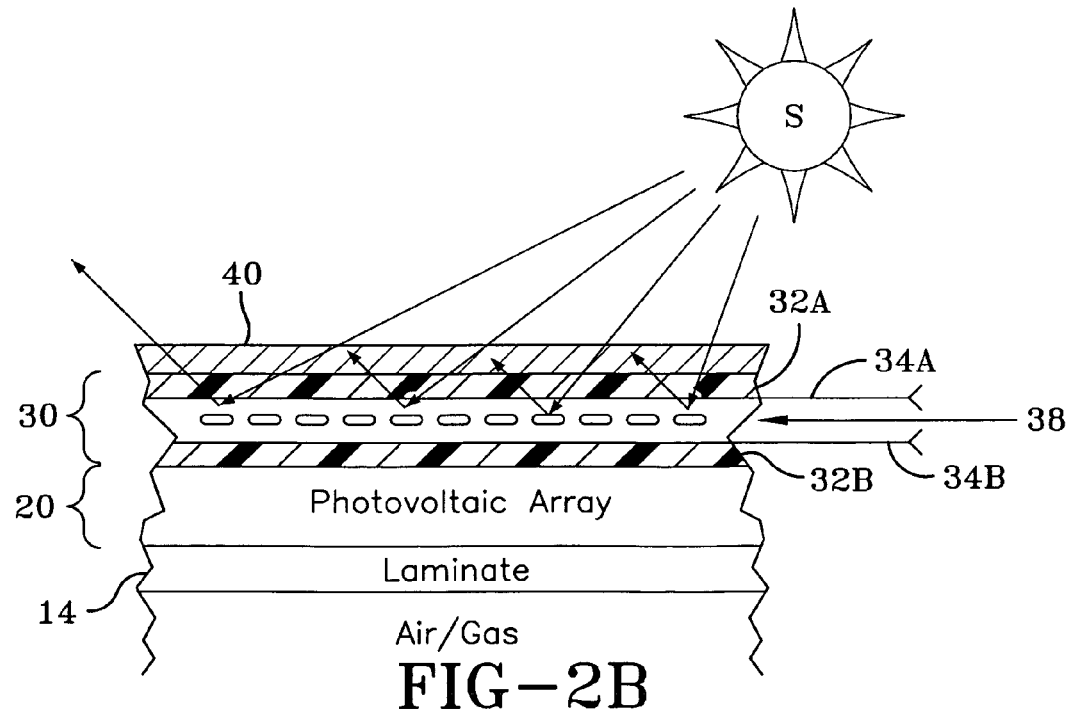
FIG. 2B is a schematic cross-sectional view of a supporting structure which carries a photovoltaic array and electro-optic shutter according to the present invention, wherein the shutter is in a reflective mode.

Referring now to FIGS. 2A and 2B, it can be seen that the electro-optic shutter 30 is disposed on and covers the photovoltaic array 20 which is supported by the laminate material 14. As mentioned previously, the laminate material 14 encloses air and/or lifting gas in a manner well known in the art. Although the present embodiment is discussed as being in association with an airship, it will be appreciated that the concepts of the present invention are equally applicable to any supporting structure which carries a photovoltaic array and wherein it is desired to control the amount of solar radiation exposed to the array. In any event, the electro-optic shutter 20 includes a pair of opposed substrates 32A and 32B which face one another. In most embodiments the substrates 32 are constructed of a flexible plastic material which is light weight so as to minimize weight of the airship. However, in some embodiments the substrates 32 could be glass or any other material commonly associated with electro-optic shutters. A gap is formed between the substrates which may be provided by polymeric materials or spacers such as beads, cylindrical rods or polymer wall configurations which maintain a desired spacing between the substrates. Each substrate includes an electrode 34A and 34B on respective facing surfaces of the substrates 32A and 32B. An electro-optic material 38 is disposed between the substrates. The material is selected so that it is electrically controllable and the electro-optic material is selected such that it is switchable between a transmissive condition and a reflective condition. Although any type of electro-optic or electrochromic material can be used, it will be appreciated that liquid crystal materials such as a guest-host dye configuration, cholesteric liquid crystal materials or any other material that is switchable between transmissive and reflective modes by application of a voltage across the electrodes may be utilized. Accordingly, application of a voltage across the electrodes 34 may switch the material between reflective and transmissive conditions. The substrates may be provided with alignment layers so as to control the orientation of the liquid crystal materials and to optimize the ability to reflect selected radiation wavelengths and absorb the desired radiation wavelengths so that is the wavelengths are received by the photovoltaic array.

An ultra-violet/infrared filter 40 may be disposed over the electro-optic shutter so as to prevent harmful radiation from adversely affecting the shutter 30, the array 20, and/or the laminate material 14.

As seen in FIG. 2A, radiation, also referred to as sun light, from the sun if projected onto the airship and the electro-optic shutter is switched into a transmissive condition so that the radiation reaches the photovoltaic array for the generation of electrical energy. In FIG. 2B it can be seen that the electro-optic shutter is configured into a reflective condition so that orientation of the electro-optic material is changed and reflects the radiation or sunlight. Skilled artisans will appreciate that the representation of the electro-optic material is for the understanding of the reader and that any orientation of the material may be utilized to achieve the desired effect.

Figure 3:
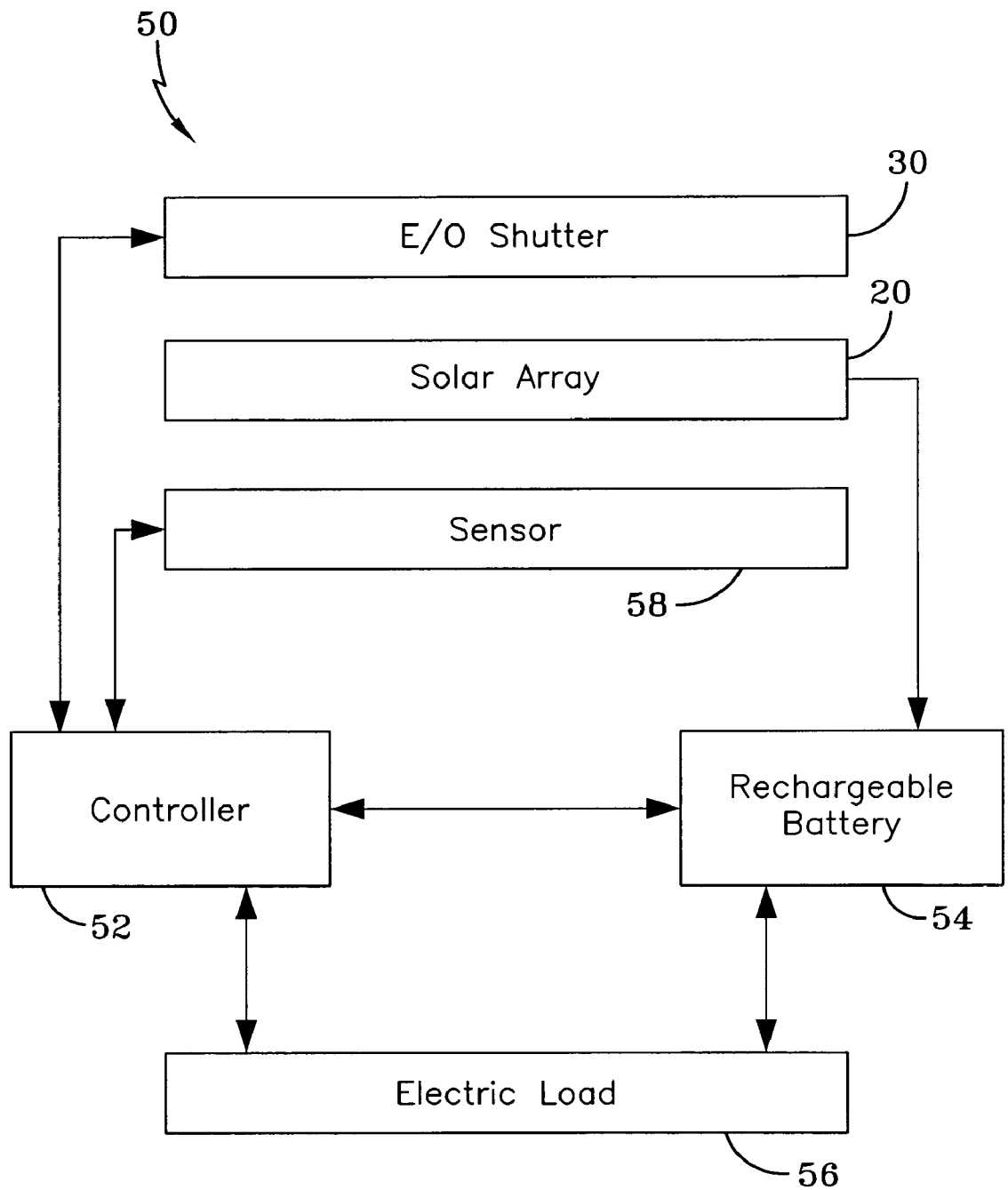
FIG. 3 is a schematic diagram of a control system utilized to operate the electro-optic shutter and other components associated with the structure.

Referring now to FIG. 3, an airship control system, designated generally by the numeral 50, is utilized so as to control operation of the components associated with the airship. The control system 50 includes a controller 52 which may be any processor-based device that incorporates the necessary hardware, software and memory components to coordinate multiple components carried by the airship. The controller shown is specifically for the purpose of operating the components discussed herein, but it may also be used for other features maintained by the airship. Connected to the controller 52 is a rechargeable battery 54 wherein the controller observes the amount of power retained by the battery. The battery may be in the form of a closed-loop regenerative fuel cell, lithium-ion battery or any other electrical storage device that can be associated with the airship or other structure. The control system may be used with any support structure that carries a photovoltaic array and an electro-optic shutter. Connected to both the controller 52 and the rechargeable battery 54 is an electric load 56 which may be any component utilized or carried by the airship. As noted previously, the airship utilizes propellers, surveillance and communications equipment that require electrical energy, and all of these components are identified as the electric load.

The solar array 20 is utilized to generate electrical energy which is transmitted to the rechargeable battery 54 for the purpose of storing the energy and wherein the controller utilizes that stored energy and controls distribution of power from the battery to the electrical load as needed. The electro-optic shutter 30 is positioned over the solar array to control the amount of radiation exposed to the solar array as previously described. As such, the controller 52 may control selected portions of the electro-optic shutter so as to control the amount of electrical energy generated as needed. To assist in determining whether the solar array should be exposed to solar radiation or not, a sensor 58 is associated with the solar array 20. The sensor 58 may be placed between the solar array and the laminate material or it may be directly incorporated into the solar array or in close proximity thereto. In any event, the sensor 58 provides temperature information which is critical to the operation of the airship or associated structure. As such, when the sensor detects that the airship and/or the solar array is in an over-heated condition, that information is transferred to the controller which can make a determination as to whether sufficient power is stored and, as such, allow the electro-optic shutter to be activated into a reflective mode when electrical energy is not required by the rechargeable battery 54. In this manner, the airship control system can optimize operation of the airship and/or any other supporting structure associated with the photovoltaic array for a desired operation. As such, if the rechargeable battery is in a low condition, the electro-optic shutter can be in a totally transmissive condition and allow for maximum utilization of the solar array. It will further be appreciated that the electric-optic shutter could be used in areas that do not cover the solar array so as to reflect solar radiation and maintain other portions of the airship in a condition that does not allow for excessive generation of heat. When the rechargeable battery is fully charged, this information can also be relayed to the controller and the electro-optic shutter can be activated so as to more easily dissipate heat when electrical power is not required or is not needed to be stored.

In view of the foregoing it will be appreciated that there are several advantages to the airship control system 50 and the combined electro-optic shutter and photovoltaic array. Such a configuration is advantageous in that it allows for selective use of the solar array so as to prevent over charging of a rechargeable battery and to prevent overheating of the entire assembly when the batteries no longer require charging. Such a configuration is also advantageous in that it allows for optimal use of the photo-voltaic array without adding excessive weight to the overall airship structure.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An improved photovoltaic array comprising:
   a support structure comprising a laminate material which encloses a lifting gas;
   a photovoltaic array carried by said support structure;
   an electro-optic shutter disposed on said photovoltaic array;
   a control system connected to said electro-optic shutter, said control system configured to switch said electro-optic shutter between transmissive and reflective conditions so as to control exposure of light to said photovoltaic array;
   a rechargeable battery connected to and receiving power from said photovoltaic array, and connected to said control system, wherein upon detection that said rechargeable battery has reached a predetermined charge level, said control system switches said electro-optic shutter between reflective and transmissive conditions; and
   a temperature sensor associated with at least one of said photovoltaic array and said electro-optic shutter, said temperature sensor connected to said control system, wherein said control system selectively switches portions of said electro-optic shutter between said transmissive and reflective conditions based upon input received from said temperature sensor and a current charge level of said rechargeable battery, such that at least one portion of said photovoltaic array is exposed to solar radiation and at least one second portion of said photovoltaic array is not exposed to solar radiation.

2. The array according to claim 1, wherein said electro-optic shutter comprises:
   a pair of opposed substrates having a gap therebetween, each said substrate having an electrode associated therewith.

3. The array according to claim 2, further comprising:
   an electro-optic material disposed between said pair of substrates, said material selected from the group consisting of liquid crystal materials and electrochromic materials.

4. The array according to claim 1, further comprising:
   an ultra-violet/infrared filter disposed over said electro-optic shutter.

* * * * *